(12) United States Patent
Brenes

(10) Patent No.: US 6,896,239 B1
(45) Date of Patent: May 24, 2005

(54) METHOD AND APPARATUS FOR LOCKING A VALVE

(76) Inventor: Arthur J. Brenes, 5855 Jensen Rd., Castro Valley, CA (US) 94546

( * ) Notice: Subject to any disclaimer, the term of this patent is extended or adjusted under 35 U.S.C. 154(b) by 163 days.

(21) Appl. No.: 10/421,594

(22) Filed: Apr. 22, 2003

(51) Int. Cl.$^7$ .............................................. F16K 35/00
(52) U.S. Cl. ......................... 251/92; 251/89; 251/326; 92/17
(58) Field of Search ............................. 251/89, 92, 93, 251/195, 326; 137/384.8, 385; 92/17, 23

(56) References Cited

U.S. PATENT DOCUMENTS

| | | | |
|---|---|---|---|
| 4,162,690 A | * | 7/1979 | Anderson .................... 137/385 |
| 4,718,637 A | | 1/1988 | Contin |
| 5,597,184 A | | 1/1997 | Brenes et al. |
| 5,881,998 A | | 3/1999 | Brenes |
| 5,884,899 A | | 3/1999 | Brenes |
| 5,975,492 A | | 11/1999 | Brenes |
| 6,293,306 B1 | | 9/2001 | Brenes |
| 6,443,426 B1 | | 9/2002 | Brenes |

* cited by examiner

*Primary Examiner*—F. Daniel Lopez
*Assistant Examiner*—John K. Fristoe Jr.
(74) *Attorney, Agent, or Firm*—Dorsey & Whitney LLP

(57) ABSTRACT

An apparatus for locking a valve having a valve member movable between an open position and a closed position. The apparatus includes an actuator assembly, a locking base, a locking shaft, and a locking pin. The actuator assembly moves the valve member between the open position and the closed position. The locking base has a through-bore extending from the lower portion to an upper portion, a first thread provided on the upper portion, and a first locking bore extending transversely therethrough. The locking shaft reciprocally extends through the through-bore of the locking base and includes an upper end having a second thread that is selectively engagable with the first thread of the locking base when the valve member is in a predetermined position, and a second locking bore extending transversely through the locking shaft. The locking pin has a shackle bore configured and dimensioned to receive the shackle of a lock, wherein the locking pin is receivable through the first and second locking bores when the valve member is in as predetermined position and the first and second locking bores are aligned for locking the valve member in the predetermined position. A method of using the apparatus for locking a valve is also disclosed.

22 Claims, 4 Drawing Sheets

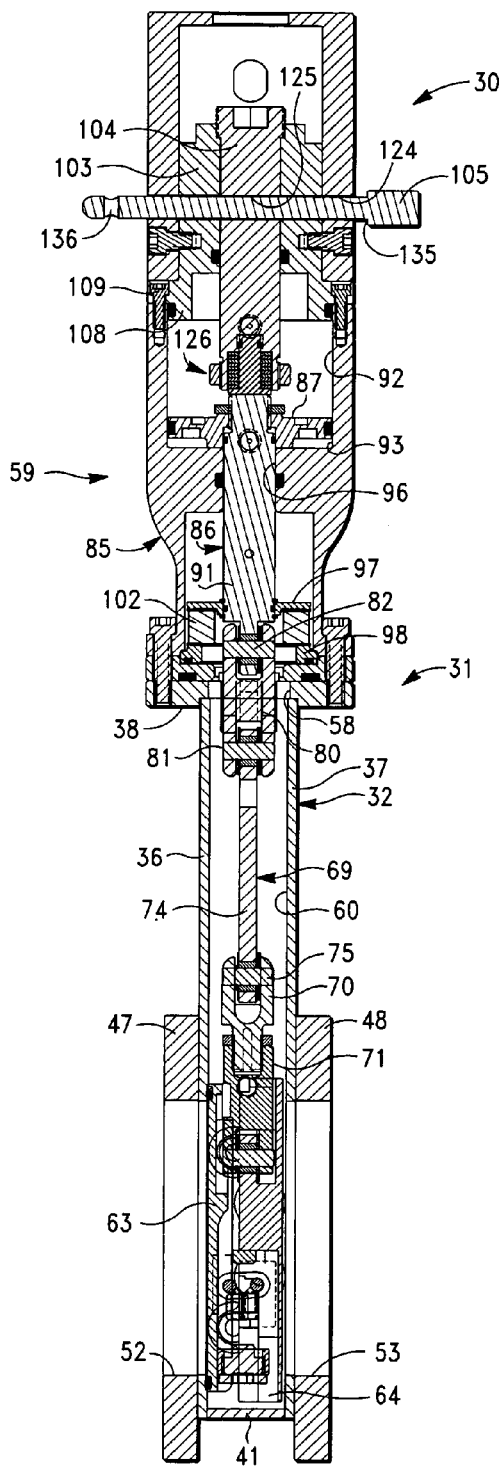
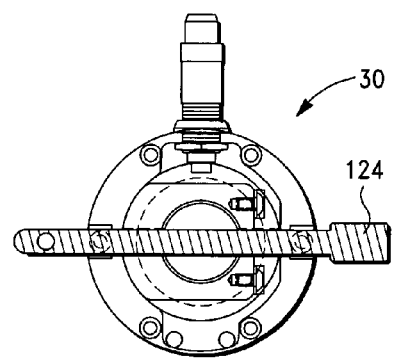
FIG.-5
FIG.-4

METHOD AND APPARATUS FOR LOCKING A VALVE

BACKGROUND OF THE INVENTION

1. Field of the Invention

The present invention relates, in general, to an apparatus for locking a valve in a closed position and methods for the use thereof. The present invention is particularly suited for locking a gate valve used in the manufacture of silicon wafer chips in a closed position.

2. Description of Related Art

In the manufacture of silicon wafer chips, wafer processing is done within process chamber modules that perform the various processing tasks within a vacuum environment to create circuitry on the chips. The process chamber modules are located within clean rooms and are specifically designed to prevent the accumulation of any amount of foreign material on the chips during manufacture and processing. It is well known the extent to which foreign particles can completely damage a chip.

Specialized valves have been designed for use with process chamber modules. Some prior valves are very compact and particularly suited for maximizing cleanliness within clean rooms. Often, the valves are pneumatically actuated and are very efficient in maintaining high pressure seals of the process modules.

Disadvantageously, during blackouts and other temporary power outages, the actuators of such prior pneumatically actuated valves may drift allowing the valve to inadvertently open. As process chamber modules often utilize highly toxic chemicals to process silicon wafer chips, such drift and inadvertent opening of the valve is highly undesirable, particularly during a power outage when the toxic chemicals cannot be properly purged from the process chamber modules. Additionally, a technician may not appreciate the danger of the toxic chemicals lurking within the process chamber module and attempt to manually open the valve. For example, an unwitting technician may attempt to utilize a portable pneumatic source to open the valve.

What is needed is a method and apparatus for locking a valve which overcomes the above and other disadvantages of known prior valves.

BRIEF SUMMARY OF THE INVENTION

In summary, one aspect of the present invention is directed to an apparatus for locking a valve having a valve member movable between an open position and a closed position. The apparatus includes an actuator assembly, a locking base, a locking shaft, and a locking pin. The actuator assembly moves the valve member between the open position and the closed position and includes a double-acting cylinder having a reciprocal piston component configured and dimensioned for operable connection to the valve member, and a cylinder component connected to the valve housing. The locking base has a lower portion attached to the cylinder component, a through-bore extending from the lower portion to an upper portion, a first thread provided on the upper portion, and a first locking bore extending transversely therethrough. The locking shaft reciprocally extends through the through-bore of the locking base and includes a lower end selectively abutting against the piston component, an upper end having a second thread that is selectively engagable with the first thread of the locking base when the valve member is in a predetermined position, and a second locking bore extending transversely through the locking shaft intermediate the upper and lower ends. The second locking bore is alignable with the first locking bore once the locking shaft is threadably engaged with the locking base a predetermined amount. The locking pin has a shackle bore configured and dimensioned to receive the shackle of a lock, wherein the locking pin is receivable through the first and second locking bores when the valve member is in the predetermined position and the first and second locking bores are aligned for locking the valve member in the predetermined position.

The locking base may be a position indicator. The first thread provided on the upper portion of the locking base may be an internal thread and the second thread provided on the upper end of the locking shaft may be an external thread. The lower end of the locking shaft may include a spring element biased toward the piston component. The lower end of the locking shaft may further include a spring recess and the spring element may include a spring washer and a spring plug, wherein a portion of the spring plug extends through the spring washer and is received within the spring recess. The spring element may include a plurality of spring washers, whereby the biasing force of the spring element against the piston component, when the valve member is in the predetermined position, can be adjusted by varying the number of spring washers. The lower end of the locking shaft may include a stop limiting the range of motion of the locking shaft and, in turn, the piston component in one direction.

Another aspect of the present invention is directed to a locking valve for creating and securing a vacuum tight seal to a vacuum chamber. The locking valve includes a valve housing defining a valve chamber, the valve chamber having an opening therein for providing access to the vacuum chamber, a valve plate movable within the valve chamber between an open position away from the opening and a closed position wherein the valve plate closes the opening to the vacuum chamber, an actuator assembly, a bellows shield, a locking base, a locking shaft, and a locking pin. The actuator assembly includes a piston component having a lower end operably connected to the valve plate, and a cylinder component having a lower end connected to the valve housing. The piston component and the cylinder component define at least a portion of an upper working chamber and a lower working chamber for moving the piston component and, in turn, the valve plate between the open position and the closed position. The bellows shield extends between the piston component of the actuator assembly and the valve housing for isolating the working chambers from the valve chamber. The locking base has a lower portion attached to the cylinder component, a through-bore extending from the lower portion to an upper portion, a first thread provided on the upper portion, and a first locking bore extending transversely therethrough. The locking shaft reciprocally extends through the through-bore of the locking base and includes a lower end having a spring element selectively abutting against the piston component, an upper end having a second thread that is selectively engagable with the first thread of the locking base when the valve plate is in the closed position, and a second locking bore extending transversely through the locking shaft intermediate the upper and lower ends and alignable with the first locking bore once the locking shaft is threadably engaged with the locking base a predetermined amount. The locking pin has a shackle bore configured and dimensioned to receive the shackle of a lock, wherein the locking pin is receivable through the first and second locking bores when the valve plate is in the closed position and the first and second locking bores are aligned for locking the valve plate in the closed position.

The locking valve may be a gate valve. The locking base may be a position indicator. The first thread provided on the upper portion of the locking base may be an internal thread and the second thread provided on the upper end of the locking shaft may be an external thread.

The lower end of the locking shaft may include a spring recess and the spring element includes a spring washer and a spring plug, wherein a portion of the spring plug extends through the spring washer and is received within the spring recess. The spring element may include a plurality of spring washers. Preferably, the biasing force of the spring element against the piston component, when the valve plate is in the closed position, may be adjusted by varying the number of spring washers received within the spring recess. The lower end of the locking shaft may include a stop limiting the range of motion of the locking shaft and, in turn, the piston component as the valve plate moves toward the open position.

Yet another aspect of the present invention is directed to a method for locking a valve including a valve housing, a valve member movable between an open position and a closed position within the valve housing, and a reciprocating actuator member operably connected to the valve member. The method includes the steps of threading a locking shaft into engagement with a locking base connected to the valve housing biasing a lower end of the locking shaft against the reciprocating actuator member, aligning first and second transversely extending bores in the locking base and the locking shaft, respectively, thereby positioning the reciprocating actuator member and, in turn, the valve member in a predetermined position, and inserting a locking pin through said first and second transversely extending bores thereby locking said valve member in the predetermined position.

An object of the present invention is to provide an apparatus that is capable of locking a valve in a closed position. Yet another object of the present invention is to provide an apparatus for preventing unauthorized use of the valve.

Another object of the present invention is to provide an apparatus for preventing unauthorized use of a valve.

Yet another object of the present invention is to provide a method for locking a valve in a closed position.

The method and apparatus for locking a valve of the present invention has other features and advantages which will be apparent from or are set forth in more detail in the accompanying drawings, which are incorporated in and form a part of this specification, and the following Detailed Description of the Invention, which together serve to explain the principles of the present invention.

BRIEF DESCRIPTION OF THE DRAWINGS

FIG. 4 is a cross-sectional side view of the actuator assembly and the locking assembly of FIG. 1 taken along line 4—4 of FIG. 3, the actuator assembly being shown in the closed position and the locking assembly being shown in a secured position.

FIG. 5 is a top view of the actuator assembly and the locking assembly of FIG. 1, the locking assembly being shown in the secured position shown of FIG. 4.

DETAILED DESCRIPTION OF THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to those embodiments. On the contrary, the invention is intended to cover alternatives, modifications and equivalents, which may be included within the spirit and scope of the invention as defined by the appended claims.

The present invention is directed to an apparatus for locking a valve in a closed position and methods for the use thereof. The present invention is particularly suited for locking a shielded gate valve commonly used in the manufacture of silicon wafer chips. The present invention is also particularly suited for use with other types of valves used in the manufacture of silicon wafer chips including, but not limited to, slot valves and throttle gate valves. One should further appreciate that the locking apparatus of the present invention is equally suited for use with other types of valves which have reciprocating actuators, including, but not limited to, valves having a double-acting cylinder.

Figure 1:
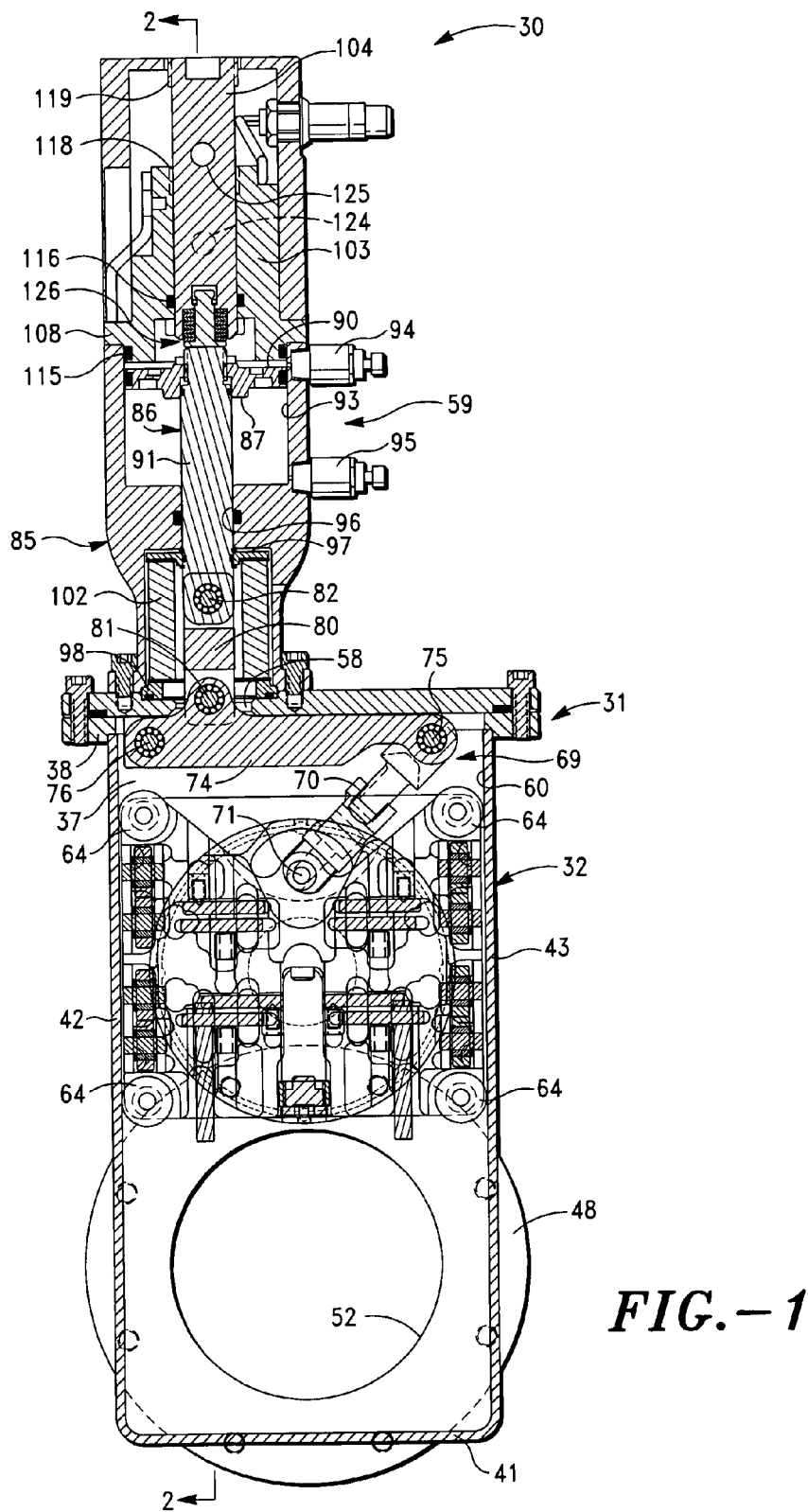
FIG. 1 is a cross-sectional front view of a gate valve in combination with an actuator assembly and a locking assembly in accordance with the present invention, the gate valve and actuator assembly shown in an open position.

Turning now to the drawings, wherein like components are designated by like reference numerals throughout the various figures, attention is directed to FIG. 1 which shows a locking apparatus, indicated generally by reference numeral 30, provided on a gate valve, indicated generally by reference numeral 31. Gate valve 31 is similar to those, including the 11000 Series and the 16000 Series gate valves, manufactured and also sold by High Vacuum Apparatus, Inc. of Hayward, Calif., and also similar to those disclosed by U.S. Pat. No. 5,884,899 to Brenes and entitled Half Profile Gate Valve, the entire content of which is incorporated herein by this reference.

Figure 2:
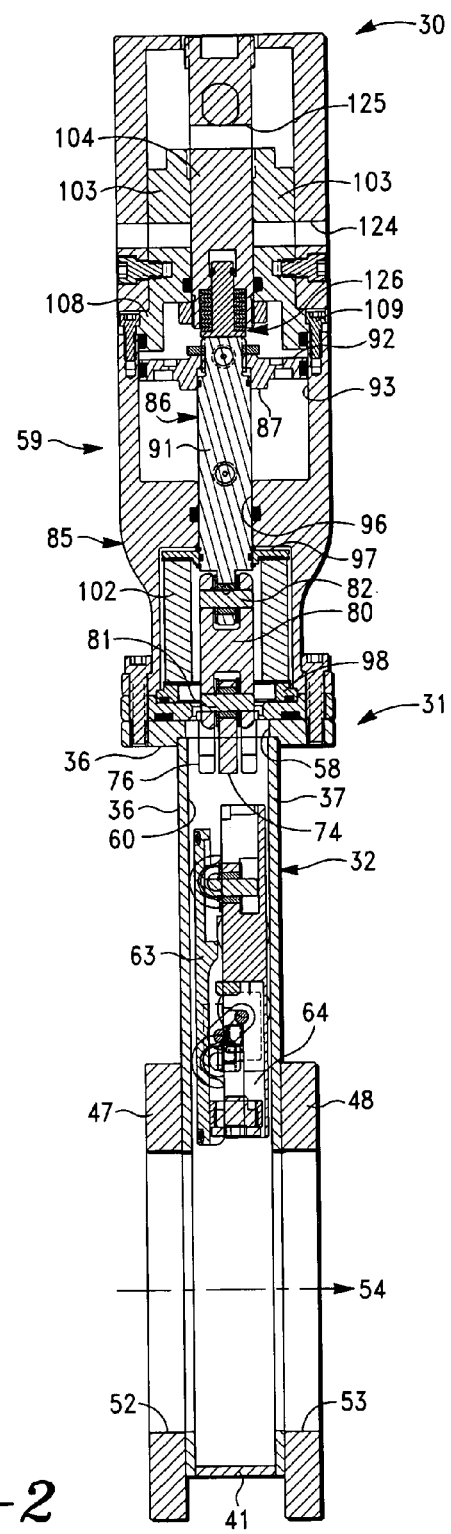
FIG. 2 is a cross-sectional side view of the actuator assembly and the locking assembly of FIG. 1 taken along line 2—2 of FIG. 1, the actuator assembly being shown in the open position.

Gate valve 31 includes an elongated box-like valve housing 32, which includes front and back walls 36, 37, a top flange 38, a bottom wall 41, and, as shown in FIG. 2, side walls 42, 43. A pair of annular flanges 47, 48 are secured to and frame the lower portions of housing 32.

A pair of aligned openings 52, 53 are provided in front and back walls 36, 37, respectively, and which openings are also defined by annular flanges 47, 48, respectively. Openings 52 and 53 will collectively be referred to as a first opening, indicated generally by arrow 54, which opening extends through valve housing 32 providing access from one side of housing 32 to the other side and, for example, into a vacuum chamber of a wafer process chamber module to which gate valve 31 is mounted in a well known manner. A second opening 58 is provided in top flange 38, which opening provides access to an actuator assembly, indicated generally by reference numeral 59 and discussed below. Side walls 36, 37, top flange 38, side walls 42, 43, and bottom wall 41 collectively form a valve chamber 60 that is capable of maintaining high pressures and/or high vacuum pressures.

For example, in one embodiment, the valve chamber is capable of maintaining high vacuum pressures, preferably in the range of approximately $1 \times 10^{-10}$ mbar to 1 bar.

Figure 3:
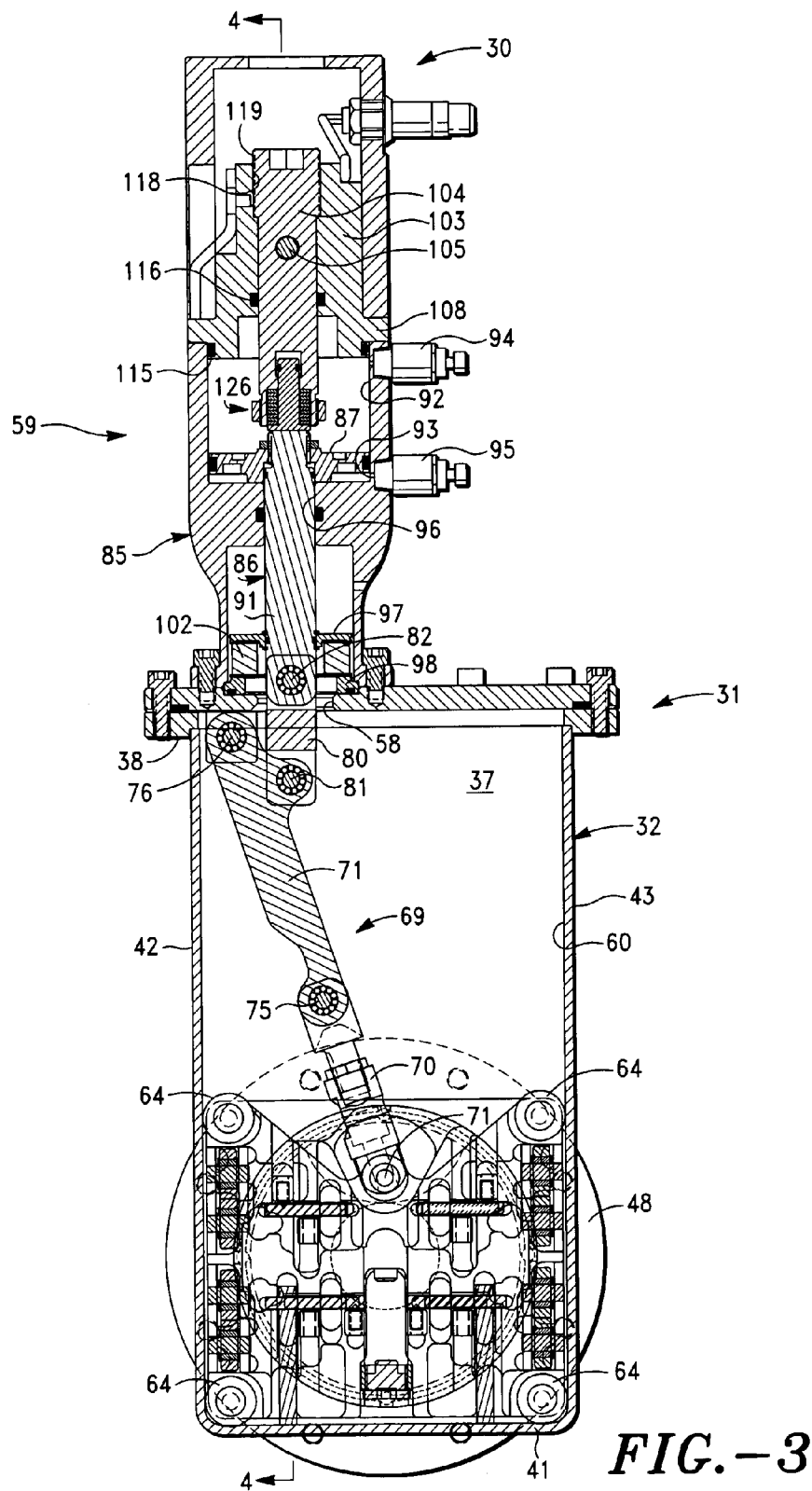
FIG. 3 is a cross-sectional front view of the gate valve, actuator assembly, and locking assembly of FIG. 1, the gate valve and actuator assembly shown in a closed position.

A circular valve plate 63 is vertically movable within valve chamber 60 from an open position away from openings 52, 53, as shown in FIG. 1, to a closed position, as shown in FIG. 3. When valve plate 63 is in the closed position, the valve plate sealingly engages front wall 36 to close-off first opening 54, thus, capable of maintaining a high pressure seal. Rollers 64 guide valve plate 63 within valve chamber 60 by engaging the interior surface of back wall 37 as the valve plate is lowered and raised between the open and closed positions. A separate sealing actuator system is provided to sealingly engage valve plate 63 against the interior surface of front wall 36 in a known manner similar to that disclosed by U.S. Pat. No. 5,884,899. Once valve plate 63 is the closed position, the valve plate closes front opening 52 thus closing first opening 54 and providing a high vacuum seal for maintaining a high vacuum within valve chamber 60 and any process chamber that is in direct communication therewith.

As most clearly shown in FIGS. 1 and 3, a linkage assembly 69 operably connects valve plate 63 to actuator assembly 59 for controlling movement of the valve plate between its opened and closed positions. Linkage assembly includes a first adjustable link segment 70 pivotally connected to valve plate 63 at first pivot 71. A second link arm 74 pivotally connected to first link segment 70 at second pivot 75 is also pivotally connected to valve housing 32 at third pivot 76. A third link segment 80 is pivotally connected to second link arm 74 at a fourth pivot 81 and partially extends from valve housing 32 through second opening 58 and is pivotally connected to actuator assembly 59 at a fifth pivot 82.

Actuator assembly 59 includes a cylinder component 85 and a piston component 86, which includes a piston 87 and a piston rod 91. Cylinder component 85 and piston component 86 generally define first and second working chambers 92, 93, that are in fluid communication via ports 94, 95 with pneumatic controls in a well known manner. Third link segment 80 is pivotally connected at fifth pivot 82 to a lower end of piston rod 91. Cylinder component 85 includes a piston guide 96 in the form of a longitudinally extending bore which receives, guides, and limits piston rod 91 to linear movement.

A first annular collar 97 is mounted at the distal end of piston rod 91 and a second annular collar 98 is mounted to top flange 38 about second opening 58. A bellows shield 102 is mounted at its ends to collars 97, 98. Bellows shield 102 functions to isolate valve chamber 60 from the sliding interengagement of cylinder 85 and piston rod 91 at piston guide 96. In this manner, particulate debris caused by wear between the cylinder structure and the piston rod is prevented from getting into valve chamber 60 where it could then migrate to the process chamber and damage equipment and/or wafer chips fabricated therein. Thus, bellows shield 102 minimizes and/or prevent particulate contamination of valve chamber 60.

Turning now to the locking apparatus, locking assembly 30 generally includes a locking base 103, a locking shaft 104 and a locking pin 105, as shown in FIG. 4. As is discussed in greater detail below, locking assembly 30 is configured to lock gate valve 31 such that valve plate 63 is securely sealing front opening 52, thus closing off first opening 54 and maintaining a vacuum tight seal for the vacuum chamber formed by valve chamber 60 and any chamber, for example, a wafer processing chamber, in direct communication with valve chamber 60.

Locking base 103 includes a lower portion that is attached to cylinder component 85. In the illustrated embodiment, locking base 103 includes a mounting flange 108 which is mounted directly to an upper portion of cylinder component 85 with a plurality of mounting bolts 109.

Locking base 103 includes a longitudinally extending through-bore 113 extending from the lower portion of the locking base to an upper portion thereof. Through-bore 113 receives locking shaft 104 in such that the locking shaft can reciprocate along a path which is substantially concentric with the path of piston rod 87. A stop 114 is provided on the lower end of locking shaft 104 limiting the locking shaft's range of motion upward and away from piston rod 91 and out from locking base 103. Preferably, stop 114 is a threaded nut which cooperates with external threads provided on the lower end of locking shaft 104, however, one should appreciate that other means can be utilized in accordance with the present invention to limit the locking shaft's upward range of motion.

The surface of the lower portions of locking base 103 and locking shaft 104 cooperate with cylinder component 85 to form the upper working chamber 92. A first O-ring 115 is provided between an upper portion of cylinder component 85 and a lower portion of locking base 103 and a second O-ring 116 is provided between locking base 103 and locking shaft 104 to provide a fluid seal suitable for the working pressures within working chamber 92. One should appreciate that locking base need not form a portion of upper working chamber 93 as shown in the figures. Instead, the locking base can be mounted externally of cylinder component in accordance with the present invention, provided that means to externally limit the range of motion of the piston rod are also provided.

Preferably, locking base 103 also serves as a position indicator for determining the position of valve plate 63. In particular, the position indicator is configured to sense the position of locking shaft 104 relative to locking base 103 from which the position of valve gate 63 may be determined.

The upper portion of locking base 103, particularly, the upper end of through-bore 113 includes an internal locking thread 118 which cooperates with an external locking thread 119 located on an upper end of locking shaft 104. The cooperating locking threads 118, 119 are provided to allow locking shaft 104 to be secured to locking base 103 in a locked position when valve plate 63 is in its closed position, as shown in FIGS. 3 and 4. To this end, the upper end of locking shaft 104 is provided with a hexagonal recess 120 allowing one to screw locking shaft 104 into locking base 103 and thus secure the locking shaft to the locking base.

Locking base 103 is provided with a first transverse bore 124 which extends from one side, across through-bore 118, and to the opposite side thereof. Locking shaft 104 is provided with a complementary sized second transverse extending bore 125. First and second bores 124, 125 are configured such that they are aligned once locking shaft 104 is sufficiently threaded within locking base 103, that is, once the locking shaft is threadably engaged with the locking base a predetermined amount for locking gate valve 31 in its closed position, as shown in FIG. 3 and discussed below.

Figure 6:
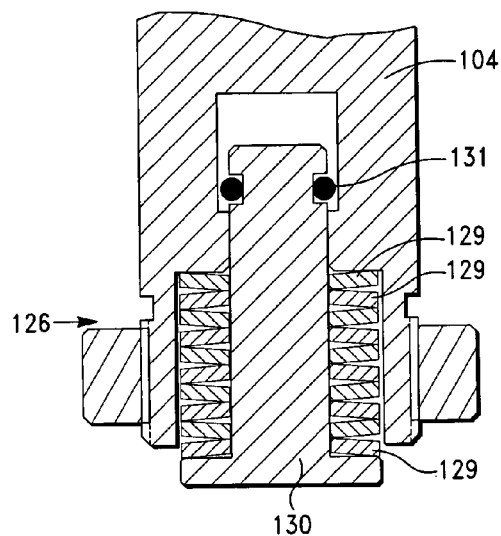
FIG. 6 is an enlarged view of a portion of the locking assembly shown in FIG. 1.

With reference to FIG. 6, locking shaft 104 includes a spring assembly 126 received in recess 127. Spring assembly 126 includes a plurality of compression spring washers 129 mounted on a spring plug 130. A third O-ring 131 is provided on spring plug 130 to hold spring washers 129 thereon, and to hold both the plug and the washers in recess 127 during assembly. Although the embodiment illustrated in FIG. 6 includes five pairs of opposed spring washers, one should appreciate that the -number and configuration of spring washers can vary in accordance with the present invention. For example, a single spring washer, one or more pairs of opposed spring washers, two, three or more similarly oriented spring washers, or a combination thereof can be used as desired. One should also appreciate that other means of providing a biasing force including, but not limited to, coil springs and elastic members, may also be used in accordance with the present invention.

Preferably, the bottom surface of spring plug 130 abuts against the upper end of piston rod 91 when gate valve 31 is opened, as shown in FIG. 1 and when gate valve 31 is closed, as shown in FIG. 3. With regard to the former, spring assembly 126 provides a shock absorbing stop which limits the motion of piston rod 91, as well as that of linkage assembly 69 and valve plate 63, as the valve is opened. With regard to the latter, spring assembly 126 provides a constant force against piston rod 91 for maintaining valve gate 63, by way of linkage assembly 69 and piston rod 91, securely in its closed position. The amount of force that spring assembly 126 applies against piston rod 91 when the valve plate is in the closed position can be adjusted by varying the number of spring washers 129, for example, removing washers to decrease the amount of force and adding additional washers to increase the amount of force.

With continued reference to FIGS. 3 and 4, locking pin 105 includes a shoulder 135 and a shackle bore 136 configured and dimensioned to receive the shackle of a conventional lock. Accordingly, once first bore 124 of locking base 103 and second bore 125 of locking shaft 104 are aligned, locking pin 105 may be inserted therein and locked in place with a conventional lock. With locking pin 105 in place, locking shaft 104 can not be moved relative to locking base 103 thus securing locking pin 63 in its closed position.

The method of locking a valve in accordance with the present invention can now be described. In operation and use, gate valve 31 is operated such that actuator assembly 30 to move valve plate between its opened and closed positions in a manner similar to the described in U.S. Pat. No. 5,884,899. In certain instances, for example, during a power outage, it may be desirable to lock gate valve 31 in its closed position. Locking gate valve in the below manner would prevent an technician from opening gate valve 31 by attaching a portable pneumatic source to ports 94 and 95.

In such instances gate valve 31 is to be locked, and when valve plate 63 is its closed position as shown in FIG. 3, an operator will first insert an allen wrench into hex key recess 120 and turn the allen wrench in one direction to thread locking shaft 104 into locking base 103. Next, the operator continues turning the allen wrench until locking shaft 104 is sufficiently threaded into locking base 103 to prevent valve plate 63 from moving from its closed position, that is, once first and second bores 124 and 125 are aligned. The operator may determine alignment of the bores by visual inspection or by a position indicator, provided that the locking base has such a position indicator incorporated therein. Once the bores are aligned, the operator inserts locking pin 105 through first and second bores 124 and 125 thus assuring that spring assembly 126 properly limits upward motion of piston rod 91 such that valve plate 63, by way of linkage assembly 59, is securely maintained in its closed position.

Finally, the operator inserts the shackle of a conventional lock through shackle bore 136 of locking pin 105 thus locking the pin in place and preventing others from opening gate valve 31. In order to unlock gate valve 31, the operator merely reverses the above process.

Advantageously, the apparatus of the present invention provides a means to prevent someone from opening gate valve having a double-acting cylinder. For example, in the case where the valve is a gate valve used in combination with a silicon wafer process chamber module, the apparatus of the present invention provides a means to prevent someone from inadvertently opening the gate valve during a power outage or other circumstance where toxic chemicals have not been properly purged from the process chamber.

For convenience in explanation and accurate definition in the appended claims, the terms "up" or "upper", "down" or "lower" are used to describe features of the present invention with reference to the positions of such features as displayed in the figures, and are not intended to limit the scope of the claims.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. An apparatus for locking a valve having a valve member movable between an open position and a closed position, the apparatus comprising:
   an actuator assembly having a reciprocal piston operatively coupled to move the valve member between the open position and the closed position, the actuator assembly being connected to a valve housing;
   a locking base fixed against movement relative to the valve housing, a through-bore extending from a lower portion to an upper portion of the locking base, a first thread provided on the upper portion, and a first locking bore extending transversely through the locking base and across the through-bore; and
   a locking shaft reciprocally extending through the through-bore of the locking base and including a lower end selectively abutting against the piston, an upper end having a second thread that is selectively engagable with the first thread of the locking base when the valve member is in a predetermined position, and a second locking bore extending transversely through the locking shaft intermediate the upper and lower ends and alignable with the first locking bore once the locking shaft is threadably engaged with the locking base a predetermined amount.

2. The apparatus of claim 1 wherein the actuator assembly comprises a double-acting cylinder reciprocally receiving the piston and fixed against movement relative to the valve housing.

3. The apparatus of claim 2 wherein the locking base is secured to the cylinder.

4. The apparatus of claim 1 further comprising a locking pin having a shackle bore configured and dimensioned to receive the shackle of a lock, wherein the locking pin is receivable through the first and second locking bores when the valve member is in the predetermined position and the first and second locking bores are aligned for locking the valve member in the predetermined position.

5. The apparatus of claim 1 wherein the valve is a gate valve.

6. The apparatus of claim 1 wherein the locking base is a position indicator.

7. The apparatus of claim 1 wherein the first thread provided on the upper portion of the locking base is an internal thread and the second thread provided on the upper end of the locking shaft is an external thread.

8. The apparatus of claim 1 wherein the lower end of the locking shaft comprises a spring element biased toward the piston.

9. The apparatus of claim 8 wherein the lower end of the locking shaft further comprises a spring recess and the spring element includes a spring washer and a spring plug, wherein a portion of the spring plug extends through the spring washer and is received within the spring recess.

10. The apparatus of claim 8 wherein the spring element comprises a plurality of spring washers, whereby the biasing force of the spring element against the piston, when the valve member is in the predetermined position, can be adjusted by varying the number of spring washers.

11. The apparatus of claim 1 wherein the lower end of the locking shaft comprises a stop limiting the range of motion of the locking shaft and, in turn, the piston in one direction.

12. A locking valve for creating and securing a vacuum tight seal to a vacuum chamber, comprising:
   a valve housing defining a valve chamber, the valve chamber having an opening therein for providing access to the vacuum chamber;
   a valve plate movable within the valve chamber between an open position away from the opening and a closed position wherein the valve plate closes the opening to the vacuum chamber;
   an actuator assembly including a piston having a lower end operably connected to the valve plate, and a cylinder having a lower end connected to the valve housing, the piston and the cylinder defining at least a portion of an upper working chamber and a lower working chamber for moving the piston and, in turn, the valve plate between the open position and the closed position;
   a bellows shield extending between the piston of the actuator assembly and the valve housing for isolating the working chambers from the valve chamber;
   a locking base having a lower portion attached to the cylinder component, a through-bore extending from the lower portion to an upper portion, a first thread provided on the upper portion, and a first locking bore extending transversely therethrough;
   a locking shaft reciprocally extending through the through-bore of the locking base and including a lower end having a spring element selectively abutting against the piston component, an upper end having a second thread that is selectively engagable with the first thread of the locking base when the valve plate is in the closed position, and a second locking bore extending transversely through the locking shaft intermediate the upper and lower ends and alignable with the first locking bore once the locking shaft is threadably engaged with the locking base a predetermined amount; and
   a locking pin having a shackle bore configured and dimensioned to receive the shackle of a lock, wherein the locking pin is receivable through the first and second locking bores when the valve plate is in the closed position and the first and second locking bores are aligned for locking the valve plate in the closed position.

13. The locking valve of claim 12 wherein the valve is a gate valve.

14. The locking valve of claim 12 wherein the cylinder comprises a guide surface for guiding linear movement of the piston component.

15. The locking valve of claim 12 wherein the locking base and the locking shaft collectively define a portion of the upper working chamber.

16. The locking valve of claim 12 wherein the locking base is a position indicator.

17. The locking valve of claim 12 wherein the first thread provided on the upper portion of the locking base is an internal thread and the second thread provided on the upper end of the locking shaft is an external thread.

18. The locking valve of claim 12 wherein the lower end of the locking shaft comprises a spring recess and the spring element includes a spring washer and a spring plug, wherein a portion of the spring plug extends through the spring washer and is received within the spring recess.

19. The locking valve of claim 18 wherein the spring element comprises a plurality of spring washers.

20. The locking valve of claim 19 wherein the biasing force of the spring element against the piston when the valve plate is in the closed position can be adjusted by varying the number of spring washers received within the spring recess.

21. The locking valve of claim 12 wherein the lower end of the locking shaft comprises a stop limiting the range of motion of the locking shaft and, in turn, the piston as the valve plate moves toward the open position.

22. A method for locking a valve including a valve housing, a valve member movable between an open position and a closed position within the valve housing, and a reciprocating actuator member operably connected to the valve member, the method comprising the steps of:
   threading a locking shaft into engagement with a locking base connected to the valve housing biasing a lower end of the locking shaft against the reciprocating actuator member;
   aligning first and second transversely extending bores in the locking base and the locking shaft, respectively, thereby positioning the reciprocating actuator member and, in turn, the valve member in a predetermined position; and
   inserting a locking pin through the first and second transversely extending bores thereby locking the valve member in the predetermined position.

\* \* \* \* \*